United States Patent [19]
Barry

[11] 4,127,094
[45] Nov. 28, 1978

[54] ENGINE

[76] Inventor: Leonard D. Barry, 19300 Pennington, Detroit, Mich. 48221

[21] Appl. No.: 769,000

[22] Filed: Feb. 16, 1977

Related U.S. Application Data

[63] Continuation of Ser. No. 331,385, Feb. 12, 1973, abandoned.

[51] Int. Cl.² .............................................. F02B 53/00
[52] U.S. Cl. .................................. 123/229; 418/248; 104/147 R
[58] Field of Search .................... 123/8.17, 8.27, 8.33; 60/39.34; 104/147 R, 155; 418/248, 249, 251, 184, 177

[56] References Cited

U.S. PATENT DOCUMENTS

| 975,637 | 11/1910 | Renik | 418/248 |
|---|---|---|---|
| 1,151,489 | 8/1915 | McIntyre | 123/8.07 |
| 1,347,709 | 7/1920 | Porter | 418/249 X |
| 3,467,070 | 9/1969 | Green | 123/8.33 |
| 3,923,032 | 12/1975 | Studenroth | 123/32 B X |

FOREIGN PATENT DOCUMENTS 1,451,715  5/1969  Fed. Rep. of Germany .......... 123/8.33

*Primary Examiner*—Carlton R. Croyle
*Assistant Examiner*—Michael Koczo, Jr.

[57] ABSTRACT

This invention is an engine for operating on internal combustion, steam or compressed gases or as a pump and has one or more cam faced pistons which move along a cylinder tube and open and close valve valves which separate lengths of the cylinder into chambers. Gate valves for the tube have semicircular concave ends to radius of the tube to seal against tapered convex ends of the piston while passing the piston between chambers. The internal combustion engine has a compression-combustion chamber inside the piston, jet nozzle port therefrom to the rear chamber sealed by the gate valve to provide back pressure to drive the engine, thus extending the efficiency of the engine over a wider speed range to eliminate transmission gearing.

The engine can be made linear or rotary, and the rotary engine can have high torque because the tubular cylinder is around the periphery of a disc to be driven. The engine utilizes impulse reaction, expansion, back pressure and jet exhaust all combined to increase efficiency, deliver near continuous torque along the cylinder, and can be made self starting.

8 Claims, 26 Drawing Figures

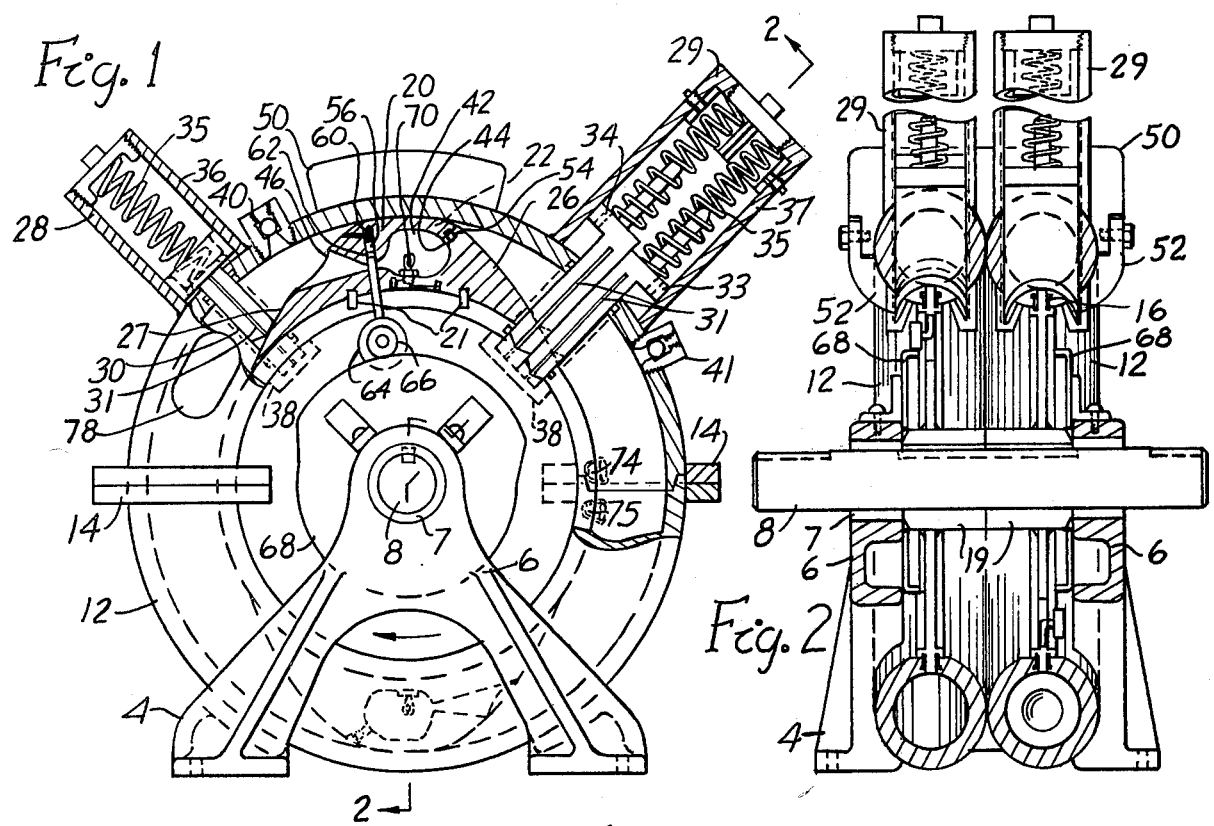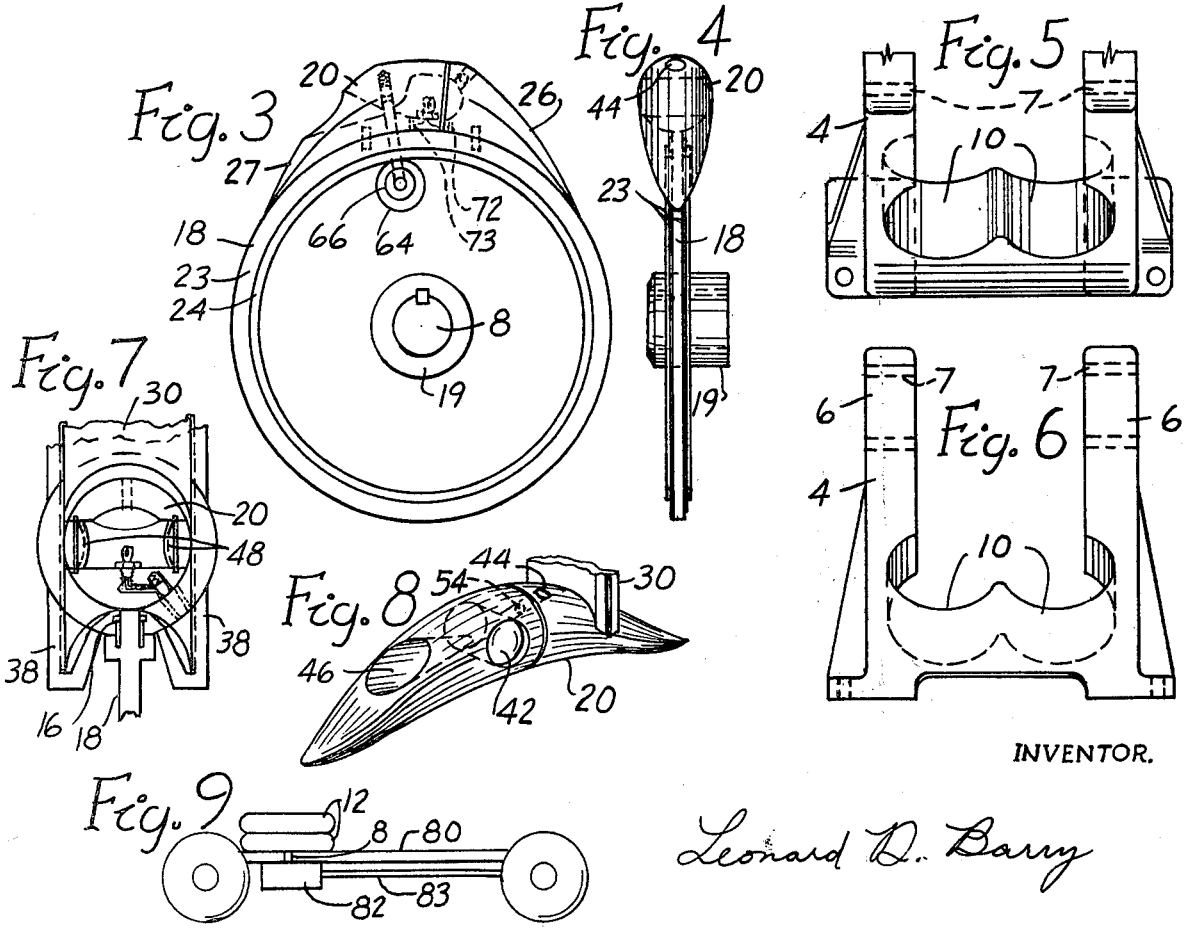

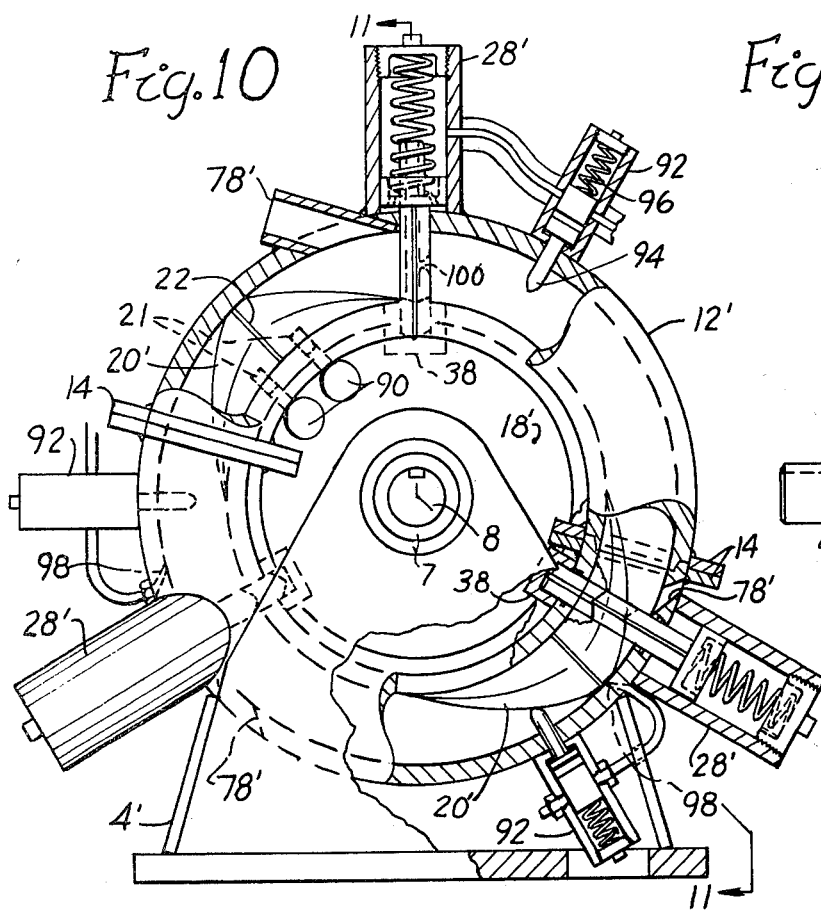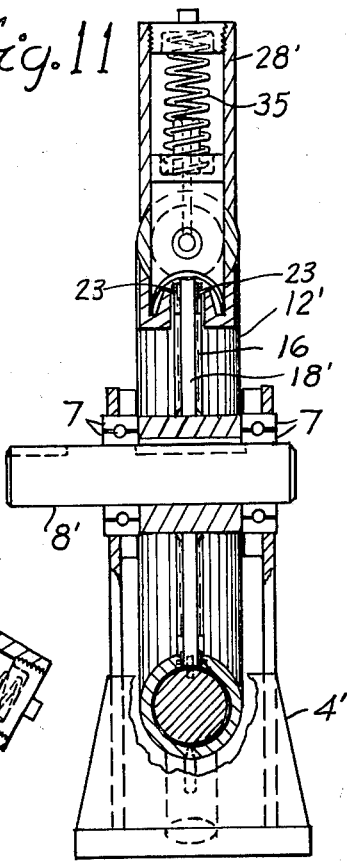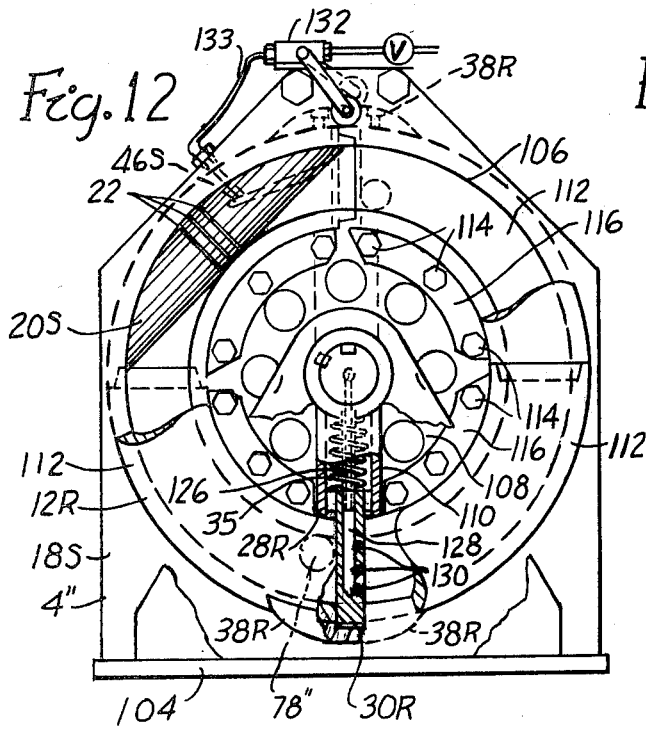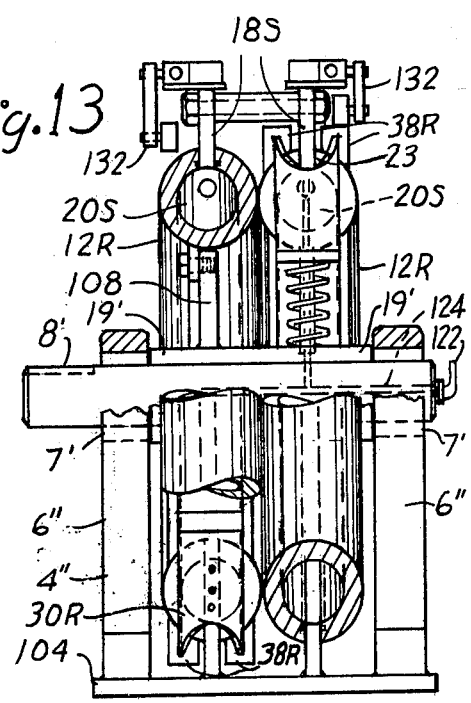

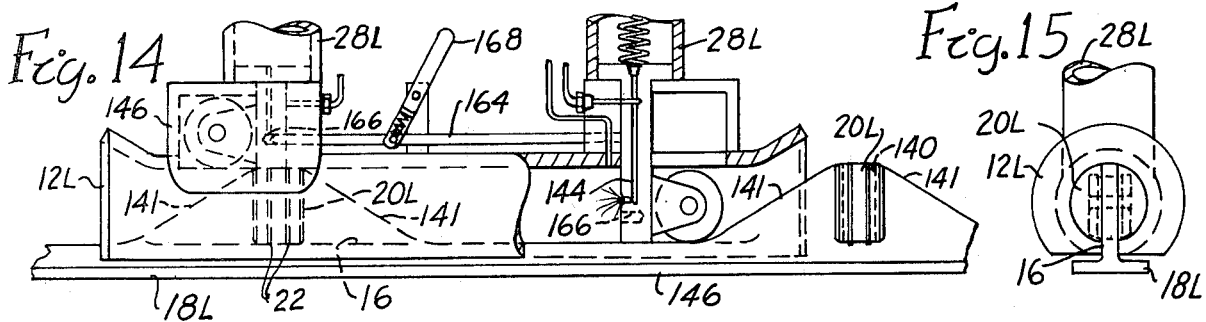
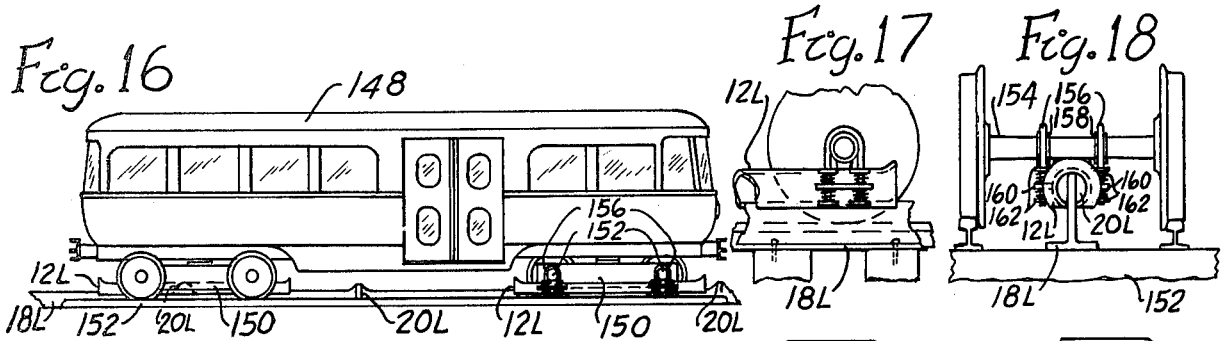
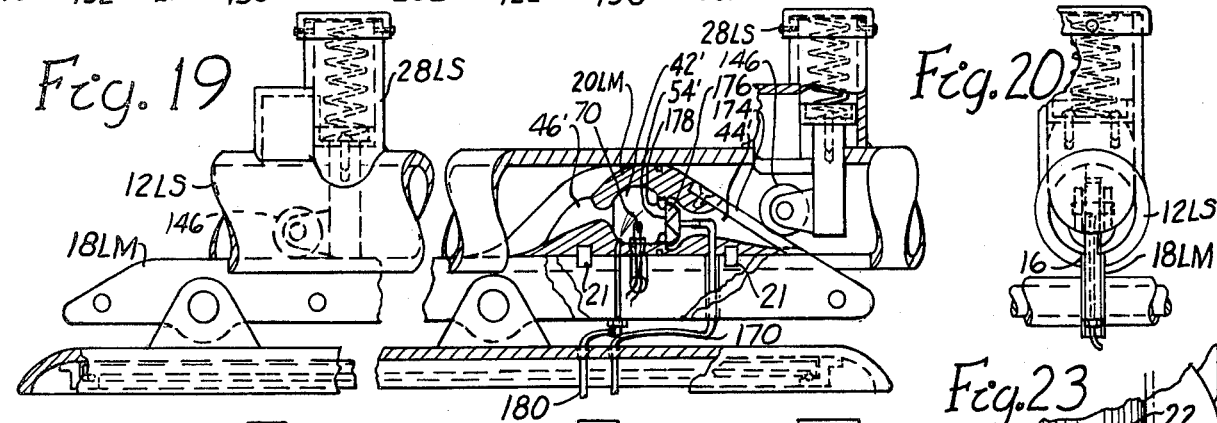
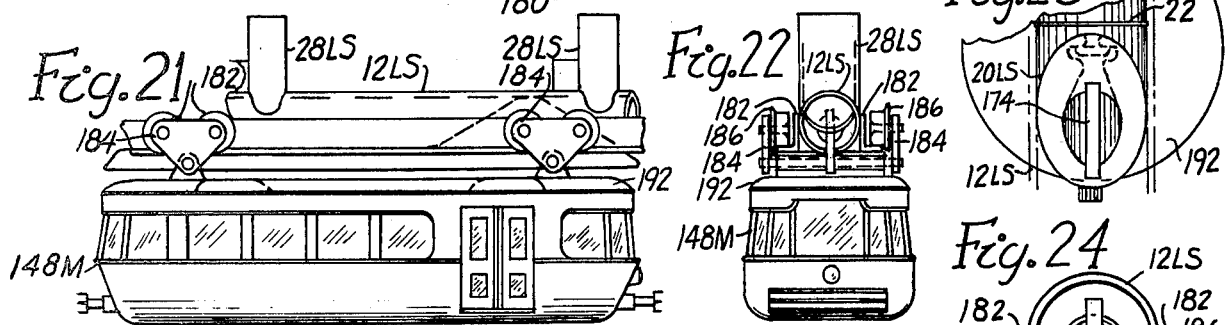
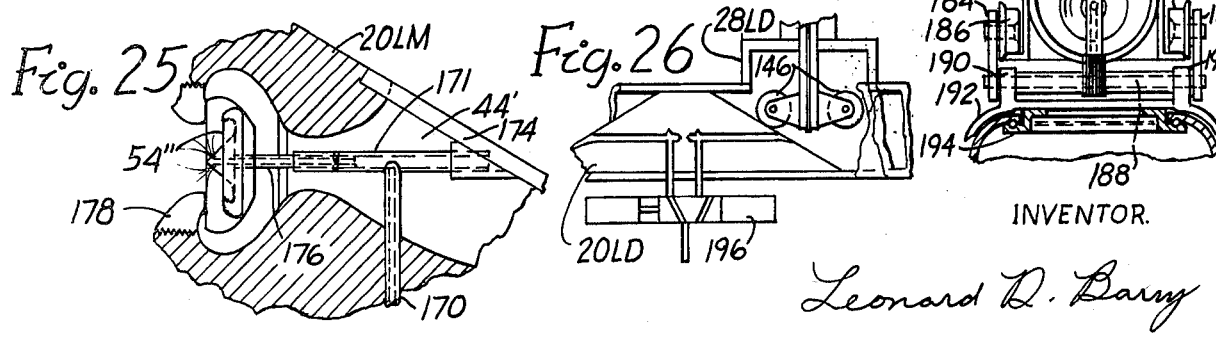

ENGINE

This is a continuation, of application Ser. No. 331,385, filed Feb. 12, 1973 and now abandoned.

This invention relates to devices for converting thermal energy or pressure into motion and vice versa and in particular to a unidirectional-piston engine wherein the piston runs in a linear or curved chamber of constant crossection with a slot lengthwise into which a gap plate or strip fits and seals the chamber. Cam gate valves seal off the chamber at intervals. One or more pistons are each sandwiched between cam extensions in the gap plate shaped to wedge open the valves against closing force for the piston to pass the valves and control their closing without chatter. The piston can have cam faces contoured to seal on a concave-closing edge valve gate while opening and closing for passage of the piston. Pressure is introduced between the piston and a valve gate sealing off the chamber to propel the piston and gap plate, or pressure is built up between a valve and the piston and forced through an opening in the chamber between the valve and piston to pump fluid. The chamber is partially sealed off from entry of fluid to form a vacuum which acts as a brake when pressure or fuel is shut off, or the piston can be held and the chamber propelled.

Objects of this invention are to provide a simple, efficient and novel engine for propelling vehicles or doing work. A further object is to provide a rotary engine design which can find use as an internal combustion engine, air engine, steam engine or pump with only minor change. Thus through standardisation and increased utilization of tooling, coasts can be cut. Another object is to provide a linear propulsion system of simple design for use in such applications as the propelling and stopping of vehicles. Another object is to provide a jet piston engine for high speed efficiency and back pressure buildup behind the piston for low speed power and efficiency to increase overall efficiency or eliminate need for gear shift.

Other and further objects and advantages will be mentioned herein or should be apparent to those skilled in the art from consideration of this invention as disclosed with reference to the drawings wherein FIG. 1 is an end view of a rotary cam-piston hydrocarbon fuel-air vapor engine with portions broken away to show details;

FIG. 2, a side view on line 2—2 of FIG. 1;

FIGS. 3 and 4, face and edge views of a piston on a gap disc of the engine;

FIGS. 5 and 6, a half plan and a side elevation of the engine frame;

FIG. 7, a radial section through the piston at gates of FIG. 1 to larger scale;

FIG. 8, a perspective of a piston opening a gate of the engine;

FIG. 9, a side view of a vehicle with the engine installed;

FIGS. 10 and 11, end and side views of a variation of the rotary cam-piston engine adapted for operating on compressed air or steam or as a pump;

FIGS. 12 and 13, end and side views of another variation of the rotary cam-piston engine adapted for operating on air or steam or as a pump;

FIGS. 14 and 15, side and end views of a linear form of cam-piston engine;

FIG. 16, a side view of railway car having trucks on each of which the cylinder of the linear engine is mounted, the car being shown on track having a piston cam rail of the engine secured to ties between standard track rails;

FIGS. 17 and 18, sections of track with a truck axle supporting the engine cylinder on a piston rail respectively lengthwise and crosswise the railway track at a wheel set, to larger scale than FIG. 16;

FIGS. 19 and 20, side and end views of a variation of the linear form of the engine;

FIGS. 21 and 22, side and end views of a monorail car on piston tube track to illustrate an application of the engine of FIGS. 19 and 20;

FIGS. 23 and 24, plan and end sectional views of monorail engine track with trolley of the monorail car of FIGS. 21 and 22 thereon;

FIG. 25, an enlarged section of the fuel-air intake lengthwise through the center of piston;

FIG. 26, a side sectional view of a cam valve gate with opening wheels thereon riding a piston to cam open in either direction of travel.

Referring to the drawings and in particular to FIGS. 1-8 for details of a cam-piston engine which has a base frame 4 of cast iron or aluminum with supports 6 for bearings 7 for shaft 8 and annular pockets 10, FIGS. 5 and 6, which holds two ring cylinders 12 concentric with shaft 8. Each of the cylinders is made up of two semicircular tubes with flanges 14 on which they are pined, bolted and sealed together at each end. The tubes bolted together are of identical circular cross section and aligned to form the ring cylinder. Each ring cylinder has a straight slot 16 through the center of the inner wall into which a gap plate disc 18 slip fits. Each disc 18 is secured on a hub 19 keyed to shaft 8. Each gap plate 18 carries a piston 20 which slip fits in the gap in ring cylinder 12 and is secured by dowels 21 to the disc 18. One or more piston rings 22 around piston 20 seals the piston on a radial plane in the ring cylinder 12. Seal rings 23 around ledges 24 on rim of disc 18 help seal the gap.

Piston 20 has cam faces 26 and 27 for respectively opening and closing cam valves 28 and 29. Valve 28 has a gate 30 with spring steel seals 31. Valve 29 has two gates 33 and 34 which slide on each other and have a seal 31 on each for better sealing. Valves 28 and 29 are closed by springs 35 within housing 36 and 37 respectively, and their gates which slide at right angles to the cylinder in radial plane have a semicircular concave end which seals against the piston and recesses into pockets 38 secured air tight on tube 12 to close off the tube at respectively the left and right ends of piston 20 in the position shown. The cam faces of piston 20 are tapered as a wedge and in cross section are convex to the radius of the inside of cross section of tube 12 the same radius as end of gates of valves 28 and 29 to seal passage by the valves substantially as the piston lifts the valves 28 and 29 in turning clockwise in ring tube 12 carrying disc 18 and shaft 8 clockwise therewith. The convex edges of gates of valves 28 and 29 are tapered to the slope of the wedge of the piston for better seal on the piston while opening and closing.

Fuel-air mix and air intake check valves 40 and 41 are secured in ring cylinder 12 just past gate valves 28 and 29 to draw in fuel-air mix and air respectively and to prevent the drawing of a vacuum in the chamber behind the piston which would stop or slow the engine.

Each piston 20 has a firing chamber 42 transversely therethrough, a charging port 44 between the tapered front at top of the piston and a firing chamber with a check valve 54 to prevent reverse flow from the firing chamber, and a jet nozzel port 46 directed from the firing chamber out to rear of the piston. Spherical disks 48 are secured by retainer rings against a step in the ends of the firing chamber to better hold the charge in the piston and protect the cylinder. The firing chamber can be coated with refractory material to stand the high temperatures and provide a smooth finish in the jet port. A yoke 50 over top of cylinders 12 is clamped on the cylinders by fingers 52 screwed onto the yoke.

The intake sweep from gate 20 clockwise to gate 34 is the charging chamber in which piston 20 compresses the fuel-air mix sucked in behind the previous passage of the piston. This charge is compressed ahead of the piston against gate 34 and enters the firing chamber through check valve 54 in port 44 and continues even while gates of valve 29 are being pushed open by the cam wedge 26 of the piston until gate 34 is fully opened.

A cam valve 56 preferably blocks the jet port 46 while the firing chamber is being charged. Valve 56 is a cylindrical rod which extends through the throat of the jet port and slides in a radial hole in piston 20 to block off the firing chamber and is forced outward by spring 60 to where a throat hole 62 through valve 56 opens the jet port. Rod 56 extends out from the piston and through a radial hole in the disc in which it is keyed from turning and extends into hole 64 through the disk whereat rod 56 is bent out at right angle from the disk to a straight end on which cam wheel 66 is secured for engaging a stationary cam disk 68 secured by tabs 69 to the inner side of supports 6. The rim of disk 68 is cammed out to extend rod valve 56 in along the portion of disk 68 where valve 56 is to be closed for charging the firing chamber and to hold the charge until firing.

A spark or glow plug 70 secured in the firing chamber is electrically connected across two spring extended pins 72 and 73 which slide in insulated bushings in holes through the piston 20. These pins each align and contact tapered pins or wedges 74 and 75 respectively. Pins 74 and 75 extend through and are insulated from cylinder 12 at the position of pins 72 and 73 respectively when gate valve 29 is almost closed behind piston 20 and substantially just as wheel 66 leaves cam 68 to open the jet port. Pins 74 and 75 are slightly recessed in the wall of cylinder 12 so as only to be contacted by pins 72 and 73 respectively which extend into the recesses while the piston is passing pins 74 and 75. If the glow plug is used pins 74 and 75 are connected each to a conductor recessed inside tube 12 for pins 72 and 73 to be in contact with pins 74 and 75 for a longer arc than if the spark plug is used to ignite the charge. Pins 74 and 75 are connected across a voltage source to fire the plug 70 to ignite the fuel charge in chamber 42 and the jet port 46 opened for the burning gas to rush out giving reaction to drive the piston clockwise and build up pressure behind the piston against the gate of valve 29 to thrust the piston clockwise pushing air and previously burnt gas out vent and service hole 76 approximately 270° around ring 12 before the exit port 78 is passed and vents any force left from the power stroke while gate valve 28 is being cleared by the piston. The air-fuel intake valve 40, just beyond valve 28 lets in air-fuel mix behind the piston when moving the arc sweep from gate 30 through gate 34; which volume of air-fuel mix is compressed on the next rotation ahead of the piston passing between gates 30 and 34 after the next power stroke. The air intake 41 just beyond gate valve 29 prevents a vacuum from forming behind the piston on the power stroke when fuel is shut off or insufficient to carry the piston the full stroke. The pistons 20 in each cylinder are 180° out of phase to give more steady torque when operating and help balance the engine and double the horsepower over that of a single cylinder, but a single cylinder engine is workable.

This type of engine can be mounted flat in front on auto 80, FIG. 9, with engine shaft 8 vertical down to right angle drive and clutch 82, thus lowering drive shaft 83 to eliminate the usual hump in the floor of the car. Disks 18 serve as flywheels and in horizontal position help stabilize the vehicle.

This engine is not self starting but could be made so by injecting fuel directly into firing chamber with glow plug connected to be turned on to ignite it. See FIGS. 19-26 for self-starting linear type, which could be made into a rotary form by extending the cylinder around in a loop and mounting gap plates on the central disk.

Referring to FIGS. 10 and 11, the rotary cam-piston engine principles are applied to a steam or compressed air engine having parts modified from FIGS. 1-8 for this application and to illustrate variation of construction. This engine has a base-frame weldment 4' supporting shaft 8' in bearings 7 and securing ring cylinder or torus tube 12' from rotation concentric with shaft 8'. Cylinder 12' is in two semicircular pieces bolted together at end flange plates 14' as in pipe construction and has a slot 16 into which disk 18' is slipped at assembly, two cam pistons 20' are secured by dowel keys 21 to the disk through construction holes 90 in the disk. The disk has rim 24 with seal rings 23 engaging flat inner faces of ring 12', or sealing rings can be in the gap or the periphery of the disk can be laminated in the slot 16 to spread apart on the periphery and seal the slot where the cylinder has internal pressure. The pistons 20' are the same as 20 except they are solid, with combustion chamber and ports omitted. Three piston gate valves 28' are equally spaced about the outer face of cylinder 12 to close off the cylinder into three chambers. A cam valve 92 is secured to the outer face of cylinder 12' beyond each gate 28' by about 30° and has cam rod 94 extending through a hole into cylinder 12' to be engaged and pushed out against spring 96 by the passing of piston 20' to open valve 92 to connect steam or air pressure through port or nozzel 98 just behind the piston to thrust the piston forward (clockwise) by building up pressure behind the gate 28' just passed and the rear of the piston 20'. The pressure can optionally be introduced through orifice 100 in the face of the gate facing the rear of the piston as illustrated by the gate valve at the top on the engine.

Air, gas, or steam pressure enters at 98 or 100 until valve 92 controlling the inlet closes after the peak of the piston has passed the valve 92. The gate of valve 28' has a concave inner end to fit the convex periphery of pistons 20' to substantially seal at all times even while a piston is passing. The gate slides down the rear cam face of the piston returning energy from spring 35 to rotary energy of the engine and extends tips of the gate into pockets 38 welded pressure-tight to ring cylinder 12' along side of disk 18'. The gas or steam behind the piston expands as it pushes the piston clockwise approximately 100° before the piston passes exhaust port 78', which exhausts the pressure as gate 28' is being pushed out by the forward cam face of the piston to repeat the power cycle three times per revolution for each piston ie. six long power strokes per revolution around the one cylinder to give even, balanced and high torque for a given operating pressure.

To operate as a pump the inlet ports would be enlarged and valves 92 emitted. Th clockwise rotation of shaft 8' then sucks fluid from inlet 98 or 100 until that piston opens outlet 78', and next piston forces this fluid out the outlet. The usual inlet and outlet check valves would be added to prevent back flow.

As a further variation the engine, FIGS. 12 and 13, has revolving ring cylinders 12R and stationary pistons 20S, one in each cylinder and in line in FIG. 12. This engine has a frame 4" comprising base plate 104, two bearing brackets 6" secured thereto, and two parallel gap plates 18S with circular hole 106 defining the inside edge of the gap for each cylinder 12R concentric with bearings 7' in brackets 6". Bearings 7' support shaft 8' on which are secured two ring cylinders 12R each on a disk 108 welded on a hub 19' keyed to shaft 18'. Each disk 108 has a slot 110 in which the housing of a gate valve 28R is welded aligned radially. Each ring cylinder 12R is divided into four or more arc segments 112 secured by bolts 114 through flange 116 on each segment 112 to periphery of disk 108 after spring 35 and gate 30R are added to the valve housing on the disk. Gate 30R has a concave end with points which extends out from cylinder 12R each into a pocket in a cam lob 38R sealed and screwed onto ring segments 112 joining at each gate valve on each side of gap plates 183 but not touching the gap plate. Gates 30R are extended out by spring 35 and are recessed when passing piston 20S. Pistons 20S are of circular section along middle portion and have piston rings 22 in grooves therearound to seal to inside of cylinders 12R. The faces on the pistons 20S are tapered and in cross section convex to the radius of the bore of cylinder 12R to seal with the concave end of gate of valve 28R while camming the gate open and closed. Sealing rings 23 backed by resilient material in grooves on plate 188 or in gap faces of ring cylinder 12R seal the cylinders.

Compressed air or steam is fed from a revolving coupling input 122 to center hole 124 along shaft 8', through connecting holes into tubing 126 between shaft 8' and hole 128 in gate 30R of each valve 28R for the gate to slide in and out on a tube 126, and out through nozzles 130 in the rear of gate 30R. Ring cylinder 12R has an exhaust port nozzel directed out counterclockwise ahead of each gate valve to help drive the engine at high speed. Optionally the steam can be connected from inlet to a cam valve 132, through tube 133 to the inlet port and through holes in plate 18S and piston 20S out nozzel 46S to rear in piston. Valve 132 is opened by cam lob 38R to inject steam only at start of power stroke of the piston to better utilize the expansion of the steam.

This engine is shown as a two cylinder engine to enable it to be started anywhere about its turning and to balance the load on shaft 8' with gates mounted 180° apart.

The cam-piston engine can be linear. One form of linear engine, FIGS. 14–15, has a stationary continuous gap plate 18L along which cam pistons 20L are spaced and secured. Pistons 20L have a vertical groove 140 on each face which is press fit in a slot in a cam lobe 141 integral in plate 18L and sloping up to top against each end face of piston 20L. A length of piston tube 12L is flaired at ends to receive pistons 20L and has slot 16 through which the gap plate 18L can extend. The tube 12L has a cam gate valve 28L at one end which is recessed by the lobes 141 to pass the piston. Tube 12L preferably extends for more then the distance between pistons, so that a piston is always in the tube behind the gate valve except where spaced further to insert tube 12L on cam piston plate 18L or where the engine is not required to move the tube. Pressure from steam, air or gas combustion is inserted between the gate and piston to thrust the tube forward along the piston plate. The tube is guided on the piston plate and supported by the device or vehicle being driven. The pressure is injected preferably only behind a closed gate by porting 144 through the gate as shown. The gate has a front cam wheel 146 secured thereon to roll along the top of the gap plate and up the cam lobes to raise the gate over the pistons.

This motor is shown applied to mass-transit rail vehicle 148, FIGS. 16–18, which has two swivel trucks 150 powered by piston tubes 12L. Trucks 150 run on standard railway track 152 except for addition of a central inverted T-gap cam plate 18L spiked to ties of track 152. The cam tube is mounted between the axles 154 of each truck 150 on U-bolts 156 over bearings 158 on axles 154. The U-bolts extend down the side of cylinder 12L through holes in tabs 160 secured to the cylinder and support the cylinder on springs 162 at the top and bottom of tabs 160 so the cylinder can shift to receive pistons 20L therein as the car moves forward or backward. Pistons 20L help keep the car from leaving the rails at high speed.

To make the engine reversible, a gate valve 28L is provided at each end of cylinder 12L. The one at the rear according to the direction for travel is lifted as by operation over a cam lobe 141 and pinned up by engaging pin 164 in hole 166 in the gate until the valve is neded for reversing the vehicle. Pin 164 extends between gate valves 28L and is shifted or biased to shift to the rear by toggle lever 168.

Another form of the linear cam piston engine is shown in FIGS. 19 and 20 where the piston cylinder 12LS is stationary and continuous or in lengths to accelerate or stop the gap plate 18LM which runs in the cylinder and extends through slot 16 preferably along the bottom of cylinder 12LS so that dirt and water can escape rather than collect in tube 12LS. The piston 20LM is shown for operating on internal combustion with firing chamber 42' and jet port 46' therefrom out the rear. Fuel mix is inserted through tubing 170 as shown in FIGS. 18 or 24, run through holes in gap plate 18LM up through gap 16 in cylinder tube 12LS and a tight hole for tubing 170 in the piston up into inlet port 44' of piston 20LM where tube 170 is bent back straight, FIG. 19, or teed into tube 171, FIG. 25, supported in pocket in bar 174 over the central portion of inlet port 44' for wheels 146 on the gate valves 28LS to roll up to lift gate. An inlet valve 54' in piston 20LM has a central tube 176 or shaft inserted in the outlet end of tube 170 or 171 parallel the inlet passage 44'. A ring orifice 178 is screwed in the inlet end of the firing chamber to hold valve 54' from coming back out of tube 170 or 171 but allows the valve to slide forward from the position shown to seal the firing chamber off when pressure in the chamber forces the piston valve closed. Valve 54' slides back to admit more air and fuel when pressure subsides or when pressure from forward velocity opens valve 54'. Holes in tube 170 or 171 admit the fuel into air stream entering the combustion chamber. FIG. 25 shows a variation of this where the fuel is also admitted through tube 172 to holes in face of valve 54". Then when valve 54" is forced forward to seal the inlet it sprays in more fuel to help sustain combustion and give added thrust for starting. Fuel-air mix is admitted in the position of valve 54' and 54" shown in FIGS. 19 and 25 respectively. A tube 180 is run directly to the firing chamber to inject fuel for starting. A glow plug 70 replaces the spark plug for firing. The piston is shaped with straight front taper to cam open gates 28LS, each of which have a convex end and wheel 146. The piston also has a concave taper on its rear face to seal against the semicircular convex end of the gate as they are passed. This engine can also operate on steam or air pressure with injection into the firing chamber with valve 54' or 54" blocked off in the forward position and can be made in rotary form.

This engine can be applied to monorail to propel car 148M along piston tube 12LS, FIGS. 21-24. The piston tube serves as a linear support with angle rail 182 along each side on which swivel trolleys 184 support the monorail car to run. Trolleys 184 have wheels 186 secured to side plates connected by pins 188 as in industrial monorail. Pins 188 extend through brackets 190 extending up from the top of a circular swivel plate 192 which forms part of the roof of monorail car 148M and supports the car on a large ball bearing raceway ring 194 secured on the underside of swivel roof plate 192 to carry that end of the car body about a circular opening in the roof covered by plate 192.

The gap plate 18LM is thin enough steel tempered to bend in going around curves and is supported on pins 188 through spacers and holes in the gap plate, at least one of these holes being elongated lengthwise for the plate to bow as the vehicle makes a turn while trolleys 184 remain on fixed centers spacing. Cam faced piston 20LM is secured on dowels 21 to the front end of gap plate 18LM in piston tube 12LS and is sealed therein by one or more piston rings 22. Gate valves 28LS are spaced along the top of tube 12LS at less than the length of the gap plate behind the piston to enable pressure to build up between the piston and gate next behind the piston while the piston is firing as to block tube 12LS to draw a vacuum to retard vehicle 148M when the fuel or pressure to engine is shut off by valves in fuel, air or steam lines at convient location in car 148M.

Some further variations: The piston can be at the center of car 148M and double ended as shown at 20LD, FIG. 26, with reversing valve 196 for steam operation. The gate valves 28LD can have gate opening rollers 146 on each side of the gate and rectangular piston tube with flat end tapers on piston 20LD and flat gate ends on valves 28LD, FIG. 26.

Having thus described a few forms or embodiments of the engine and applications thereof it is understood that I intend to cover all forms which fall within the true spirit and scope of this invention in the following claims.

I claim as my invention:

1. An engine having a piston housing having at least one chamber having a gate valve at each end, said valve having a gate which slides in and out along a cross sectional plane through the chamber to block or open the full cross-section of the chamber, means biasing the gate to close, a piston for traveling the chamber and through the gates when open, said piston having a front and rear cam face for opening the gate for said piston to pass, a gap along the length of said housing, a gap plate means substantially sealing said gap at least along the length of said chamber to move therealong and extending out therefrom to which said piston is secured, and means for injecting pressure between said rear face and a said gate to drive said piston, said chamber being of circular cross section of constant radius, said gate having concave inner end of said radius, said piston being of substantially said radius to slip fit and seal in said chamber, said front and rear face of said piston being tapered to wedge under said gate at center and in section curved to said radius on each side of each wedge to substantially seal while opening and closing said gate.

2. In an engine as in claim 1, a tapered cam on said the rear face against which said gate closes and seals, and means for introducing fluid pressure between said gate at rear of said piston and said piston while said gate is closed on said tapered cam.

3. In an engine as in claim 1, said piston having tapered end faces, all sections along the taper being convex to fit said radius of said chamber on each side of the taper so as to seal between said chamber and said gate all along said taper, said gate engaging one side of the taper and said chamber engaging the other side of the taper on arcs of said radius.

4. An engine as in claim 1, said tubular housing being relatively stationary, said gap plate and piston being moveable therein and connected to be propelled therealong.

5. An engine as in claim 1, said gap plate and piston being relatively stationary, said tubing and gates being moveably mounted to follow along said plate.

6. An engine as in claim 1, said engine being a unidirectional rotary combustion engine, said chamber being a power-stroke chamber, a shorter charging chamber ahead of each said power-stroke chamber in said piston housing, a fuel inlet to said charging chamber having a check valve arranged to open behind the piston to draw in a fuel-air charge, said piston having a firing chamber therein and a front inlet check valve which is closed by the charge pressure in the firing chamber when the piston enters the power chamber and rear jet nozzle means including cam valve means for retaining said charge in said firing chamber until in firing position in the said power-stroke chamber, and means for firing the charge after the piston enters the said power-stroke chamber, said jet nozzle means connecting the firing chamber out the rear of the piston for reaction thrust before charging said power-stroke chamber to pressure behind said piston to extend the power stroke.

7. An engine as in claim 6, and a check valve at the entrance end of said power-stroke chamber connected to relieve a vacuum therein.

8. An engine as in claim 6 wherein said charging chamber is less than half of the length of said power-stroke chamber.

* * * * *